Patented Jan. 21, 1941

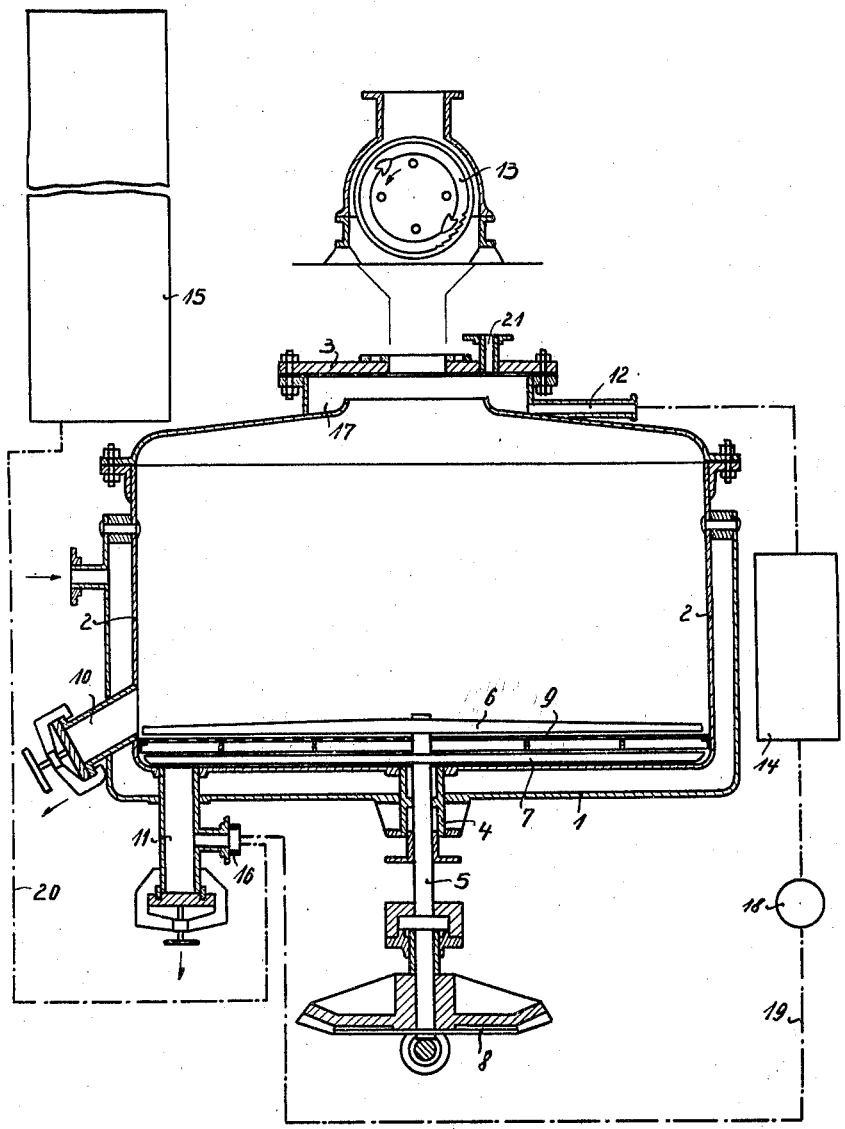

2,229,376

UNITED STATES PATENT OFFICE 2,229,376

PROCESS FOR DEHYDRATING AND DEFATTING WATER- AND OIL-CONTAINING SUBSTANCES

Philipp Lorenz Fauth, Wiesbaden-Dotzheim, and Joseph Reichert, Wiesbaden, Germany, assignors to Fauth Patent A.-G., Luxemburg, Luxemburg, a corporation Application September 27, 1937, Serial No. 166,012
In Germany August 14, 1937

5 Claims. (Cl. 260—412.6)

In our Patent No. 2,086,072 there is described a process for dehydrating and de-fatting animal substances, particularly whale parts, which consists substantially in first introducing the suitably comminuted raw material for some time into a heat-transferring agent, such as hot water, and heating it therein to temperatures in the neighbourhood of the boiling point of the water, for example 70 to 90° C., whereby relatively large quantities of the water and fat contained in the raw material are separated, and thereafter pressing the material, pretreated as aforesaid, for the purpose of removing further quantities of water and oil and finally effecting the removal of the residual water by drying the material by evaporation.

On applying this process particularly to the working up of animal carcasses, slaughterhouse waste, condemned and confiscated animals and the like it has been found that losses result, owing to the fact that relatively large quantities of the glutinous materials in the carcasses under treatment become dissolved in the water used as heat-transferring agent, are withdrawn therewith and lost, since separate working up of this waste water does not pay. Similarly on pressing the material, after pre-treatment in the water bath relatively large quantities of glutinous materials are lost together with the discharging press water, since the latter also contains substantial quantities of glutinous materials and other extracted substances.

A further difficulty in applying the above process to the working up of the aforesaid starting materials is that in this process no separation into lean and fat animal parts is possible as is effected in the working up of whales; the carcasses or the animals confiscated and apprehended in slaughter yards owing to disease, such as tuberculosis and the like, must on the contrary be worked up as they are received. Thus for example fat swine carcasses may have to be worked up together with lean cattle, dogs, cats and the like which have been condemned and slaughtered owing to disease.

In the working up of such slaughtered condemned animals and carcasses it is furthermore necessary to subject the worked up material to sterilisation by heating to relatively high temperatures, for example to 130° C., to ensure that all disease and infection bacilli are with certainty killed and that the diseases are not transferred by the concentrated feed produced to other animals.

According to this invention it has been found that the hereinbefore described dehydrating and de-fatting process can be adapted to the aforesaid requirements for the working up of animal carcasses, slaughtered condemned animals and the like and that the glutinous materials and other extracted materials hitherto lost in the water bath and the press water can at the same time be recovered by adding to the water bath albumin-precipitating and emulsion-preventing substances, for example salts such as common salt, sodium sulphate or tannin and the like, in amounts up to 20%, preferably 1–3%, and after the material under treatment has been heated for a short time in the water bath to a temperature in the neighbourhood of the boiling point of the water, raising the water bath to a temperature of about 130° C. and heating the material therein for about 30 minutes to this temperature.

The result of the co-employment of common salt, sodium sulphate or the like in the water bath is that the dissolved glutinous substances are precipitated from the water so that they can be filtered off and recovered and the result of the treatment of the material at the aforesaid relatively high temperatures is that all detrimental bacteria are killed and substances giving rise to an unpleasant smell are removed.

A further result of the co-employment of the common salt or sodium sulphate in the water bath is that the fat contained in the animal starting materials is more rapidly separated from the cells and accordingly can be more readily recovered. A further advantage of the co-employment of the common salt or sodium sulphate or similarly acting electrolytes resides in the fact that the separated fat and the water can no longer form an emulsion as occurs particularly readily in the working up of slaughtered condemned animals and particularly of carcasses which have already become slightly decomposed, owing to the decomposition of the proteins. It is known that the proteins during decomposition are readily converted into polypeptides and then into amino acids, which constitute efficient emulsifiers for the formation of water-fat emulsions.

A further characteristic feature of the process of this invention is that the material after treatment in the water bath is not pressed in a special press as in the process disclosed in Patent No. 2,086,072 for the purpose of removing further quantities of water or fat or oil, but is pressed in the same apparatus in which it has been pre-treated with the hot water. This is effected after the water bath treatment has ended and the fat or oil which has separated out on the surface of the water bath has been removed by overflow under the introduction of water, by opening the water discharge valve and pressing air under relatively high pressure onto the surface of the water bath, whereby the water is first pressed through the de-fatted material deposited on a sieve disposed at a short distance above the bottom of the boiler, after which the pressure of the compressed air acts on the material itself and removes a further large quantity of water therefrom. The further advantage is obtained thereby that during the aforesaid passage of the water of the water bath through the de-fatted material disposed on the aforesaid sieve the de-fatted material acts as a kind of filter, which filters off the glutinous materials separated out by the common salt or sodium sulphate and suspended in the water bath. This in turn has the advantage that owing to the inclusion of the filtered off glutinous and albuminous substances the de-fatted material disposed on the aforesaid sieve forms a relatively tight layer, on which the compressed air can act satisfactorily with a view to effecting further dehydration. The material treated as aforesaid is then removed from the boiler, conveyed to a drying apparatus and finally worked up into feeding stuffs.

An embodiment of apparatus suitable for carrying out the process of this invention is illustrated in sectional elevation in the accompanying drawing.

This apparatus consists substantially of a boiler 2, which can be closed above by a cover 3 and is provided with a steam jacket 1. A shaft 5 passes through a stuffing box 4 into the bottom of the boiler. Two stirrers 6 and 7 are fastened to the shaft inside of the boiler and a drying pulley 8 outside thereof. A sieve 9 is mounted between the two stirrers 6 and 7 and an outlet 10 for the removal of the de-fatted material is attached to the boiler at the height of the sieve. 11 is the water discharge pipe and 12 the oil or fat discharge pipe. 13 is a comminuting device, 14 a centrifuge and 15 a water reservoir.

The process of this invention is carried out in the aforesaid apparatus as follows:

The coarsely pre-comminuted carcasses are first comminuted in a comminuting machine 13, for example of the type described in U. S. A. patent application No. 69,652. The comminuted material then passes into the boiler 2 filled to a predetermined height with water, which has been heated to a temperature in the neighbourhood of the boiling point of the water (for example to 70 to 90° C.) and to which albumin-precipitating and emulsion-preventing substances, for example salts such as common salt and the like, have been added. During the process of filling the water is maintained at about the same temperature. On the introduction of the material into the hot water large quantities of water and fat separate out of the material, the common salt in the water bath for example very considerably promoting the separation of the water and the fat from the material. After the boiler has been filled and the material has been subjected for a short time to the aforesaid hot water treatment, the boiler is closed and heated up by passing steam into the steam jacket 2 until the steam pressure in the boiler amounts to about 3 atms. corresponding to a temperature of about 130° C. The material is subjected for about 30 minutes to this heat treatment in order to effect sterilisation, during which time the stirrers 6 and 7 are slowly rotated. The pressure is then released, the stirrers stopped and the mass allowed to remain at rest for a few minutes. During this time the fat separated from the material by the aforesaid treatment in the water bath rises to the surface of the latter, whilst the glutinous and albuminous substances absorbed by the water but again precipitated by the action of the added precipitating agents remain suspended in the water or deposit on the sieve 9 together with the solid substances.

Boiling water is then admitted from the reservoir 15 disposed above the boiler through the pipe 20 under its own pressure through the pipe 11 provided with a multi-way cock 16 into the bottom of the boiler 1, whereby the water in the boiler rises. As soon as the liquid level in the boiler has reached the level of the overflow channel 17 of the boiler, the flat floating on the surface of the water flows, together with small quantities of water and suspended glutinous materials, into this channel, and is then conveyed therefrom through the pipe 12 to the centrifuge 14, in which fat, water and glutinous materials are separated from one another. The water discharging from the centrifuge is again pumped by a pump 18 through the pipes 19 and 11 with opened cock 16 into the bottom of the boiler 1, whereby any fat retained by the solid substances disposed on the sieve 9 is washed out and rises to the surface of the water, from which, as mentioned above, it overflows into the channel 17, from which it is then withdrawn and conveyed to the centrifuge. This extraction process is continued until the centrifuge separates out no more fat. During this extraction the stirrers 6 and 7 may be slowly rotated.

The multi-way cock 16 is then turned until the pipe 20 is open and the pipe 19 closed and air is pressed by a small air compressor, for example through pipe 21, into the top of the boiler, whereby the liquid contained in the boiler is pressed through the solid materials disposed on the sieve 9 and through pipe 11, cock 16 and pipe 20, to the water reservoir 15.

The glutinous and albuminous substances separated from the glue water by the added substances and suspended in the water are thereby filtered off by the aforesaid solid materials acting as a filter, whereby the remaining layer of solid materials may also be thoroughly pressed by the further action of the compressed air. The boiling water pressed into the reservoir 15 may then be again used for the next charge in the boiler.

After the water has been pressed out of the boiler, the valves of the discharge pipe 10 and the pipe 11 are opened and the stirrers 6 and 7 are set in rotation, whereby the solid materials disposed on the sieve are discharged through the pipe 10 and any solid materials which have fallen through the sieve through the pipe 11. The highly albuminous material extensively freed from fat and water is then dried in a drying apparatus and finally worked up into fodder meal. The fat recovered by the hereinbefore described process and freed by the centrifuge from water and impurities, is of the same quality as in the initial material, since during the described process of de-fatting the fat cannot be detrimentally influenced.

The resulting flesh meal is yellow to light brown in color and almost odorless. Its fat content amounts to from 5 to 7%, calculated on 10% of water and its protein content, depending on the initial material, from 70 to 75% calculated on the dry substance.

A remarkable feature of the process is that even when working up dead material having very unpleasant odor, the final material has no unpleasant smell.

The process of this invention has also been found in like manner suitable for the working up of fish, fish waste and the like.

What we claim is:

1. A process for dehydrating and de-fatting animal material containing water and fat, particularly for the working up of animal carcasses and slaughterhouse waste, for the purpose of producing fats and animal food, comprising comminuting the material, heating the material for a short time at a temperature of about 70° to 90° C. in a pre-heated water bath containing an albumin-precipitating and emulsion preventing substance, thereafter heating the material to a temperature of about 130° C. in the water bath to effect sterilization, removing the fat which separates out on the surface of the water in the water bath, allowing the solid material to deposit, pressing a substantial amount of the water of the hot water bath through the deposited solid materials and removing said water from the solid material, then pressing the solid materials to remove further water from said material, and drying the pressed solids.

2. A process for producing fat and dehydrated animal food from animal material such as carcasses and body parts, comprising coarsely comminuting the animal material, placing the comminuted material in a preheated bath of water at a temperature close to the boiling point of water, adding an albumin-precipitating agent of the group consisting of common salt and tannin to the water bath, raising the temperature of the material in the bath to about 130° C. to alter the character of the glutin and to sterilize the material, introducing further water into the bath to raise the level to separate the upper portion of the bath which contains grease floating on the water by overflow, centrifuging the separated material to remove the grease, reintroducing the other material from the centrifugal separation into the bottom of the water bath so as to pass upwardly through the mass of solid material to separate further fat from said material, continuing the overflow, centrifugal separation and reintroduction of de-greased material until all the grease has been removed from the water bath, allowing the solid material in the water bath to settle, pressing substantially all of the hot water through the settled mass of solids, pressing the solid material to remove further liquid, and drying the pressed solids.

3. A process for dehydrating and de-fatting animal material containing water and fat, particularly for the working up of animal carcasses and slaughterhouse waste, for the purpose of producing fats and animal food, comprising comminuting the material, heating the material for a short time at a temperature of about 70° to 90° C. in a pre-heated water bath containing an albumin-precipitating agent of the group consisting of common salt and tannin, thereafter heating the material to a temperature of about 130° C. in the water bath to effect sterilization, removing the fat which separates out on the surface of the water in the water bath, allowing the solid material in the water bath to settle, applying compressed air to the surface of the water bath, withdrawing the liquid from the water bath from below the mass of deposited solid material whereby substantially all of the liquid is pressed through said mass by the compressed air pressure, pressing the remaining solids to remove additional liquid by the air pressure, and drying the remaining solids.

4. A process for producing fat and dehydrated animal food from animal material such as carcasses and body parts, comprising coarsely comminuting the animal material, placing the comminuted material in a preheated bath of water at a temperature close to the boiling point of water, adding a precipitating agent such as common salt or tannin to the water bath, raising the temperature of the material in the bath to about 130° C. to alter the character of the glutin and to sterilize the material, introducing further water into the bath to raise the level to separate the upper portion of the bath which contains grease floating on the water by overflow, centrifuging the separated material to remove the grease, reintroducing the other material from the centrifugal separation into the bottom of the water bath so as to pass upwardly through the mass of solid material to separate further fat from said material, continuing the overflow, centrifugal separation and reintroduction of de-greased material until all the grease has been removed from the water bath, allowing the solid material in the water bath to settle, applying compressed air to the surface of the water bath, withdrawing the liquid from the water bath from below the mass of deposited solid material whereby substantially all of the liquid is pressed through said mass by the compressed air pressure, pressing the remaining solids to remove additional liquid by the air pressure, and drying the removing solids.

5. A process for dehydrating and de-fatting animal material containing water and fat, particularly for the working up of animal carcasses and slaughterhouse waste, for the purpose of producing fats and animal food, comprising comminuting the material, heating the material for a short time at a temperature of about 70° to 90° C. in a pre-heated water bath containing a precipitating substance of the group consisting of common salt and tannin, thereafter heating the material to a temperature of about 130° C. in the water bath to effect sterilization, removing the fat which separates out on the surface of the water in the water bath, allowing the solid material to deposit, pressing substantially all of the hot water of the water bath through the deposited solid materials and removing said water from the solid materials, then pressing the solid materials to remove further water from said material, and drying the pressed solids.

PHILIPP L. FAUTH.
JOSEPH REICHERT.

CERTIFICATE OF CORRECTION.

Patent No. 2,229,376. January 21, 1941.

PHILIPP LORENZ FAUTH, ET AL.

It is hereby certified that error appears in the printed specification of the above numbered patent requiring correction as follows: Page 3, second column, lines 22 and 23, claim 4, for the words "a precipitating agent such as common salt or" read --an albumin-precipitating agent of the group consisting of common salt and--; and that the said Letters Patent should be read with this correction therein that the same may conform to the record of the case in the Patent Office.

Signed and sealed this 27th day of May, A. D. 1941.

(Seal)

Henry Van Arsdale,
Acting Commissioner of Patents.